(12) United States Patent
Liu

(10) Patent No.: US 12,279,594 B2
(45) Date of Patent: Apr. 22, 2025

(54) SITTING TYPE AUTOMATIC CLEANING MACHINE FOR PETS

(71) Applicant: Heping Liu, Guangdong (CN)

(72) Inventor: Heping Liu, Guangdong (CN)

( * ) Notice: Subject to any disclaimer, the term of this patent is extended or adjusted under 35 U.S.C. 154(b) by 70 days.

(21) Appl. No.: 18/072,593

(22) Filed: Nov. 30, 2022

(65) Prior Publication Data

US 2024/0172723 A1 May 30, 2024

(51) Int. Cl.
*A01K 13/00* (2006.01)

(52) U.S. Cl.
CPC .................................. *A01K 13/001* (2013.01)

(58) Field of Classification Search
CPC ............................. A01K 13/00; A01K 13/001
See application file for complete search history.

(56) References Cited

U.S. PATENT DOCUMENTS

| | | | | |
|---|---|---|---|---|
| 3,884,191 A * | 5/1975 | Stout | ..................... | A01K 13/001 119/671 |
| 4,020,796 A * | 5/1977 | Grifa | ..................... | A01K 13/001 119/671 |
| 4,505,229 A * | 3/1985 | Altissimo | ............ | A01K 13/001 119/668 |
| 4,549,502 A * | 10/1985 | Namdari | ............... | A01K 13/001 119/664 |
| 4,730,576 A * | 3/1988 | Yoshikawa | .......... | A01K 13/001 119/673 |
| 4,987,860 A * | 1/1991 | Davis | ..................... | A61D 11/00 119/671 |
| 5,448,966 A * | 9/1995 | McKinnon | ........... | A01K 13/001 119/676 |
| 5,724,918 A * | 3/1998 | Navalon-Chicote | ........................ A01K 13/001 119/668 |
| 7,100,538 B2 * | 9/2006 | Motomura | ........... | A01K 13/001 119/668 |
| 7,107,937 B1 * | 9/2006 | Anderson | ............ | A01K 13/001 119/665 |
| 7,421,978 B2 * | 9/2008 | Price | ..................... | A01K 13/001 119/671 |
| 9,986,718 B2 * | 6/2018 | Arab | ....................... | A01K 1/035 |
| 10,143,182 B1 * | 12/2018 | Ferro | ................... | A01K 27/003 |
| 10,278,545 B2 * | 5/2019 | Arab | ....................... | A47K 7/04 |
| 11,272,688 B2 * | 3/2022 | Kim | ..................... | A01K 13/001 |
| 11,582,950 B2 * | 2/2023 | Kim | ....................... | A01K 15/04 |

(Continued)

FOREIGN PATENT DOCUMENTS

| | | | | |
|---|---|---|---|---|
| EP | 0200975 A1 * | 11/1986 | | |
| EP | 3636070 A3 * | 7/2020 | .......... | A01K 13/001 |
| KR | 20150022613 A * | 3/2015 | | |

*Primary Examiner* — Monica L Perry
*Assistant Examiner* — Aaron M Rodziwicz

(57) ABSTRACT

A sitting type automatic cleaning machine for pets, comprising a cleaning machine housing; the cleaning machine housing further comprises frame profiles and metal guards; one inner side of the frame profiles is provided with a cleaning drum, the inside of the cleaning drum is clamped with an air blow frame, and the upper edge of the air blow frame near the bottom is snapped with a placement bracket; a blower is fixedly installed on the other inner side of the frame profiles near the upper position, and the bottom end of the air blow frame is provided with an air injection pipe, and the blower and the air injection pipe are connected by a hose; the top of the cleaning drum is covered with a transparent protective cover.

5 Claims, 10 Drawing Sheets

(56) References Cited

U.S. PATENT DOCUMENTS

| | | | |
|---|---|---|---|
| 2006/0169219 A1* | 8/2006 | Yaghmai | A01K 13/001 119/651 |
| 2011/0017147 A1* | 1/2011 | Petruzzi | A01K 13/001 119/671 |
| 2015/0366163 A1* | 12/2015 | Carter | A01K 13/001 119/678 |
| 2016/0135428 A1* | 5/2016 | Nicholson | A01K 13/001 119/604 |
| 2017/0099805 A1* | 4/2017 | Arab | A01K 1/035 |
| 2018/0206449 A1* | 7/2018 | Zhang | A46B 13/02 |
| 2020/0113390 A1* | 4/2020 | Yoo | A47K 3/02 |
| 2020/0170220 A1* | 6/2020 | Zhang | A01K 13/001 |
| 2023/0076432 A1* | 3/2023 | Skinner | A61G 13/102 |
| 2023/0122984 A1* | 4/2023 | Nachtigall-Fournier | A01K 13/003 119/671 |
| 2023/0240262 A1* | 8/2023 | Liu | A01K 13/001 119/673 |

\* cited by examiner

SITTING TYPE AUTOMATIC CLEANING MACHINE FOR PETS

1. TECHNICAL FIELD

The invention relates to the technical field of pet dog bathing and cleaning machines, in particular to a sitting type automatic cleaning machine for pets.

2. BACKGROUND ART

Pet dogs emit an unpleasant odor so long as they do not take a bath for a few days. Especially in summer, the unpleasant odor will occur in 1-2 days, for which the owners will have to bathe the dog frequently, hence the time occupied by taking care of the dogs is increased. In the fast-paced era where time is the biggest cost, this is a pain point for dog owners. Going to the pet store to bathe the dog requires the owner's company and costs high. Nowadays, pet-specific cleaning machines are applied for pet bathing.

Whereas, it is hard to keep the pet quiet during the bathing process using the existing cleaning machine, and not convenient to fulfil all-over cleansing and blow drying of the pet; therefore, the existing demands are not satisfied, for which we propose a sitting type automatic cleaning machine for pets.

3. SUMMARY OF THE INVENTION

The purpose of the invention is to provide a sitting type automatic cleaning machine for pets, so as to solve the problems mentioned in the background that it is hard to keep the pet quiet during the bathing process using the existing washing machine, and not convenient to fulfil all-over cleansing and blow drying of the pet.

To achieve the above purpose, the invention provides the following technical scheme: a sitting type automatic cleaning machine for pets, comprises a cleaning machine housing; the cleaning machine housing further comprises frame profiles and metal guards; one inner side of the frame profiles is provided with a cleaning drum, the inside of the cleaning drum is clamped with an air blow frame, and the upper edge of the air blow frame near the bottom is snapped with a placement bracket; a blower is fixedly installed on the other inner side of the frame profiles near the upper position, and the bottom end of the air blow frame is provided with an air injection pipe, and the blower and the air injection pipe are connected by a hose; the top of the cleaning drum is covered with a transparent protective cover.

Preferably, the metal guards are fixedly installed on the surface of the frame profiles, universal wheels are installed on the four end corners of the bottom surface of the cleaning machine housing, and the air injection pipe is provided with a check valve.

Preferably, the inside of the cleaning drum is plugged with an air uniform barrel, and the inner wall of the air uniform barrel is arranged in a circular arrangement and evenly provided with a plurality of thin through holes.

Preferably, the cleaning drum includes a drum body, air blow pipe guards and dog leash bolt seats, the annular surface of the inner wall of the drum body is evenly provided with eight air blow pipe guards, and the inner wall of the drum body is symmetrically fixed with two dog leash bolt seats.

Preferably, the air blow frame comprises an upper air delivery annular pipe, vertical air blow pipes, nozzles, connecting elbows, and an air blow disk; the air blow disk is provided below the upper air delivery annular pipe, eight vertical air blow pipes are arranged between the air blow disk and the upper air delivery annular pipe, the bottom ends of the four vertical air blow pipes spaced apart from each other are connected to the air blow disk through connecting elbows, one side of the two connecting elbows is connected with the air injection pipes, the tops of the eight vertical air blow pipes are all connected to the inner wall of the upper air delivery annular pipe, a plurality of nozzles are linearly arranged in each of the vertical air blow pipes toward the axis of the drum body, the top of each nozzle is fixed with a flat spout, the number of the thin through holes is the same as that of the flat nozzles, and the axes of the thin through holes and the flat nozzle are collinear.

Preferably, the air blow disk is located between the lower part of the placement bracket and the bottom surface of the drum body.

Preferably, the cleaning drum further comprises a drum body, air blow pipe positioning grooves, and dog leash bolt seats; the annular surface of the inner wall of the drum body is uniformly provided with four air blow pipe positioning grooves, and the inner wall near the top of the drum body is symmetrically provided with two dog leash bolt seats.

Preferably, the air blow frame further comprises an upper air delivery annular pipe, vertical air blow pipes; a lower air delivery annular pipe, and air blow ports; the lower air delivery annular pipe is located under the placement bracket below the upper air delivery annular pipe, and the lower edge of the upper air delivery annular pipe is connected with the outer edge of the lower air delivery annular pipe through four vertical air blow pipes; air blow ports are arranged on the vertical air blow pipes vertically and linearly in the direction of the drum body axis, and the lower air delivery annular pipe is connected to the air injection pipe.

Preferably, the vertical air blow pipes snap into the air blow pipe positioning grooves corresponding to the inner wall of the drum body.

Preferably, an impeller is provided above the bottom surface of the drum body and below the placement bracket; the upper side edge of the drum body is provided with an overflow port, the bottom of the drum body is fixedly installed with an impeller motor, and the impeller motor is connected to the impeller through an output shaft and a coupling, and the connection is sealed.

Compared with the prior art, the advantages of the invention are:

1. The invention can support the pet through the placement bracket, facilitating the pet to stand or lie down. The dog leash can be hung on the dog leash bolt seats, so as to maintain the stability of the pet. The transparent protective cover effectively avoids splashing of water droplets, and the cleaning process of the pet can be observed in real time. When the pet is being dried with the blower frame after cleaning, the hot dry air is diverted through eight vertical air blow pipes, the air blow disk and nozzles can blow and dry pets in all directions through flat spots, and the vertical air blow pipes are protected by the air blow pipe guards.
2. When the invention dries the pet with the air uniform barrel after cleaning, the air uniform barrel and the air blow frame can be replaced. Ventilation holes are provided on the outer surface of the air uniform barrel, facilitating the air uniform barrel to dry the pet with even ventilation through the air injection pipe, which presents two modes of quick cleaning and drying for pets.

4. BRIEF DESCRIPTION OF ACCOMPANY DRAWINGS

Figure 1:
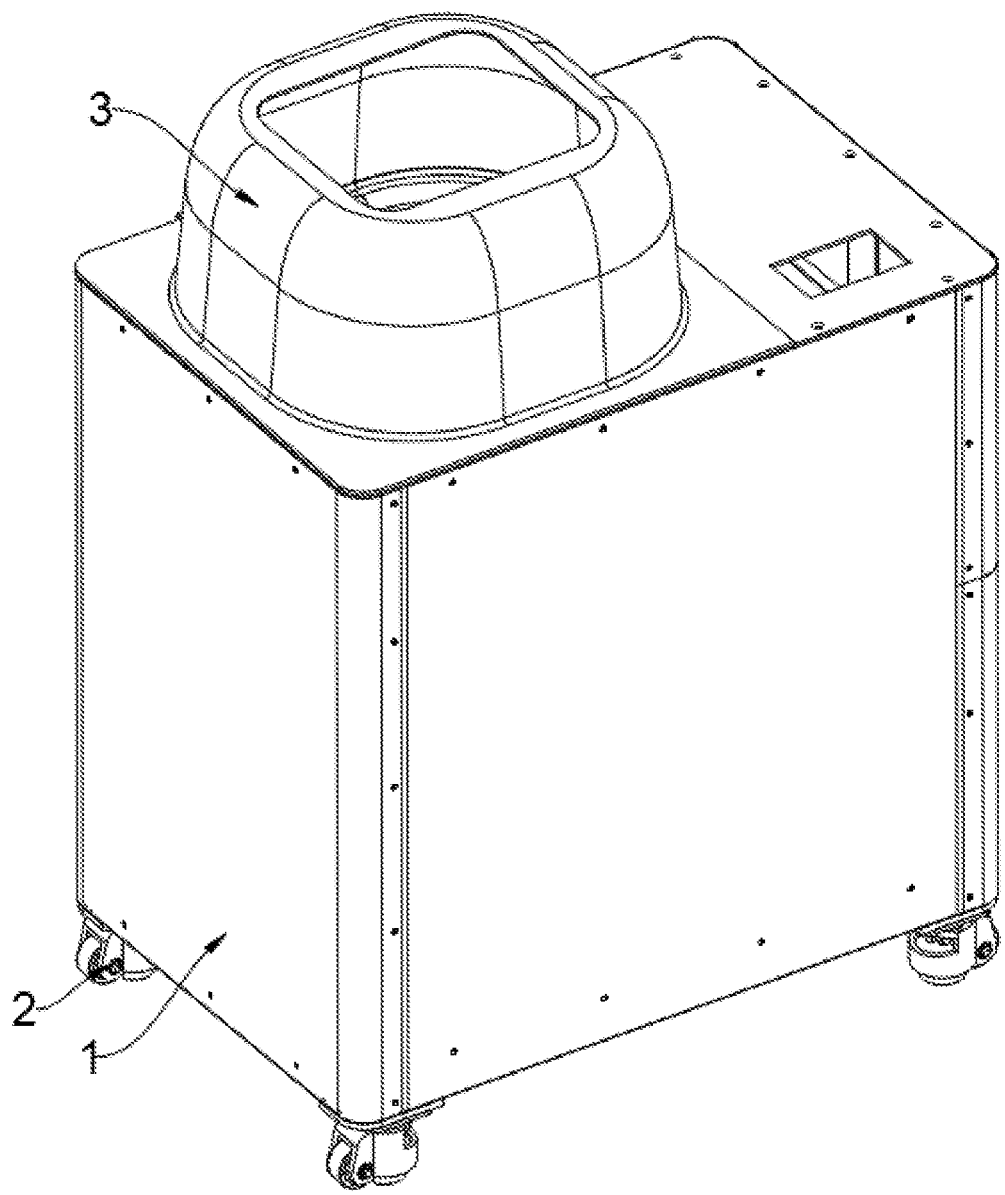
FIG. 1 is a schematic diagram of the overall structure of the invention.
Figure 2:
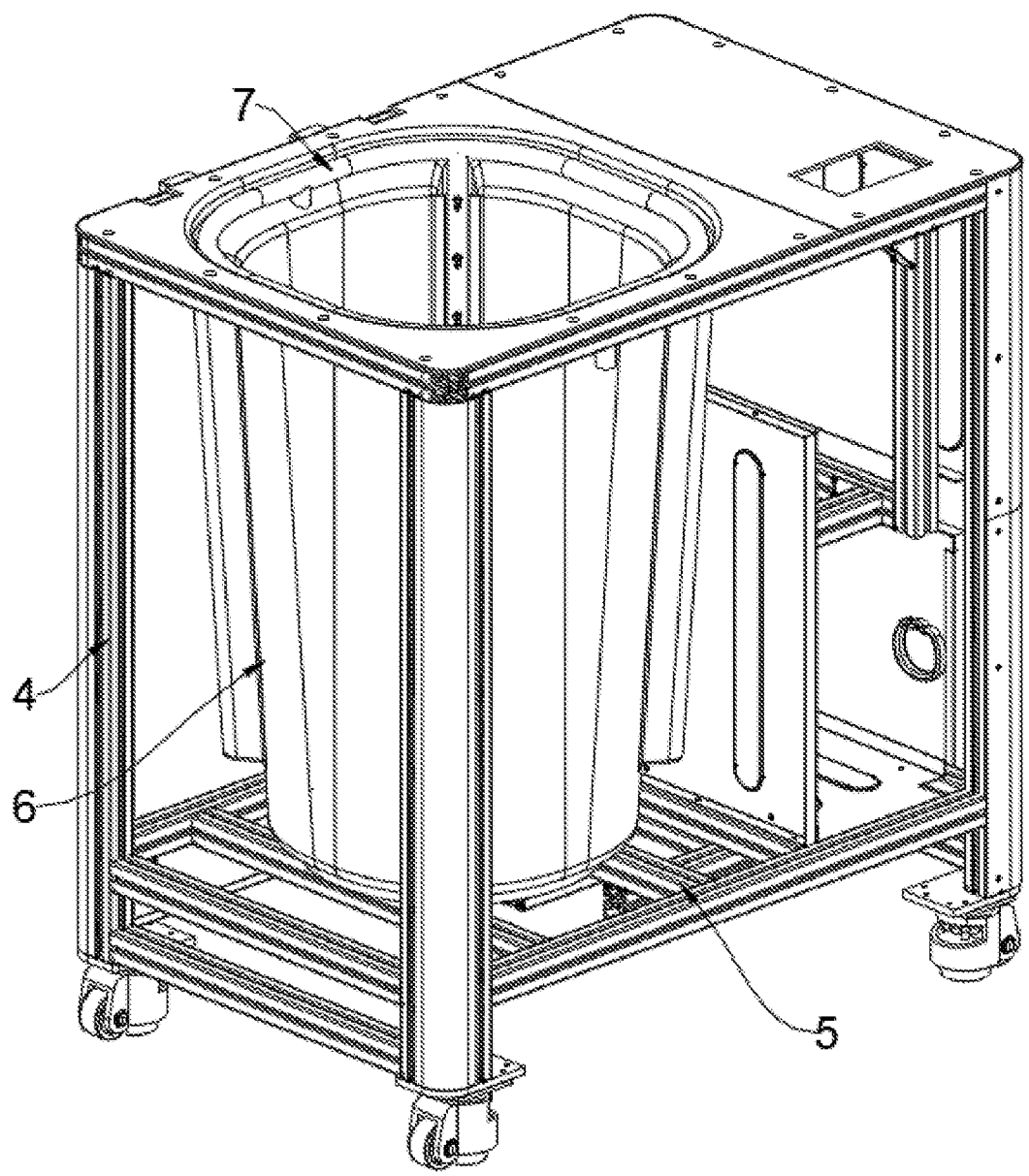
FIG. 2 is a schematic diagram of the installation structure of the cleaning drum of the invention.
Figure 3:
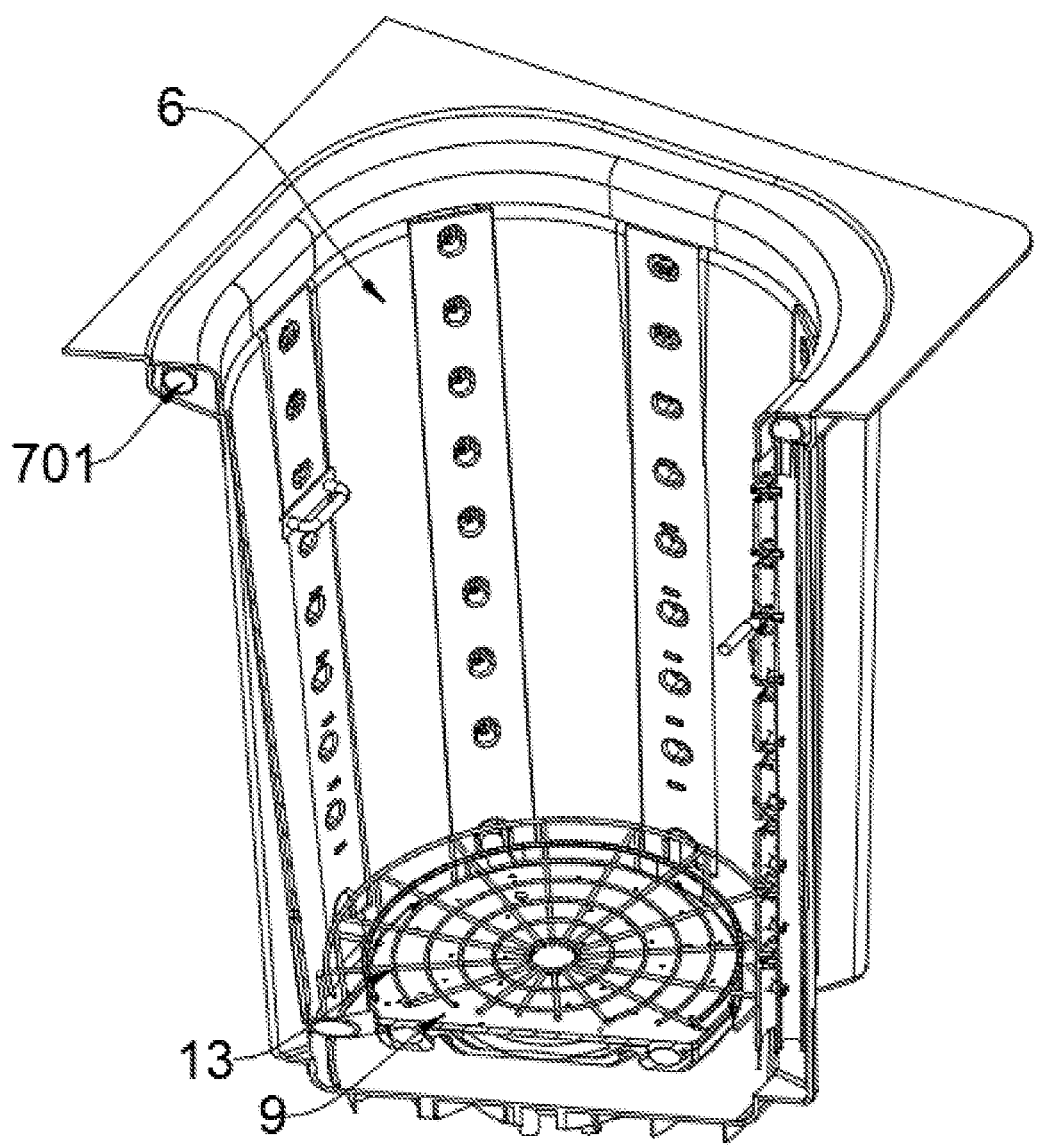
FIG. 3 is a sectional structural schematic diagram of drum body of the invention.
Figure 4:
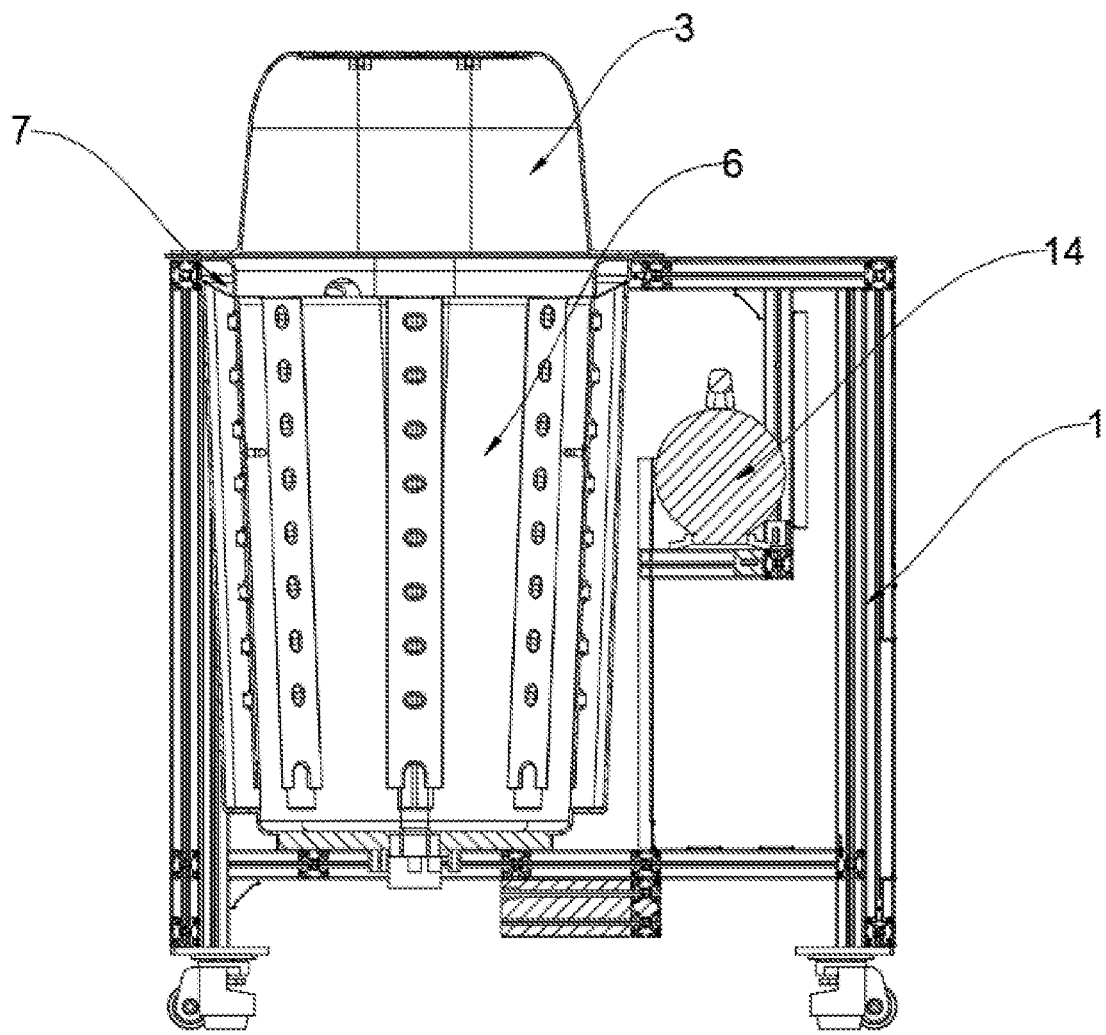
FIG. 4 is a cross-sectional structural schematic diagram of the blower of the invention.
Figure 5:
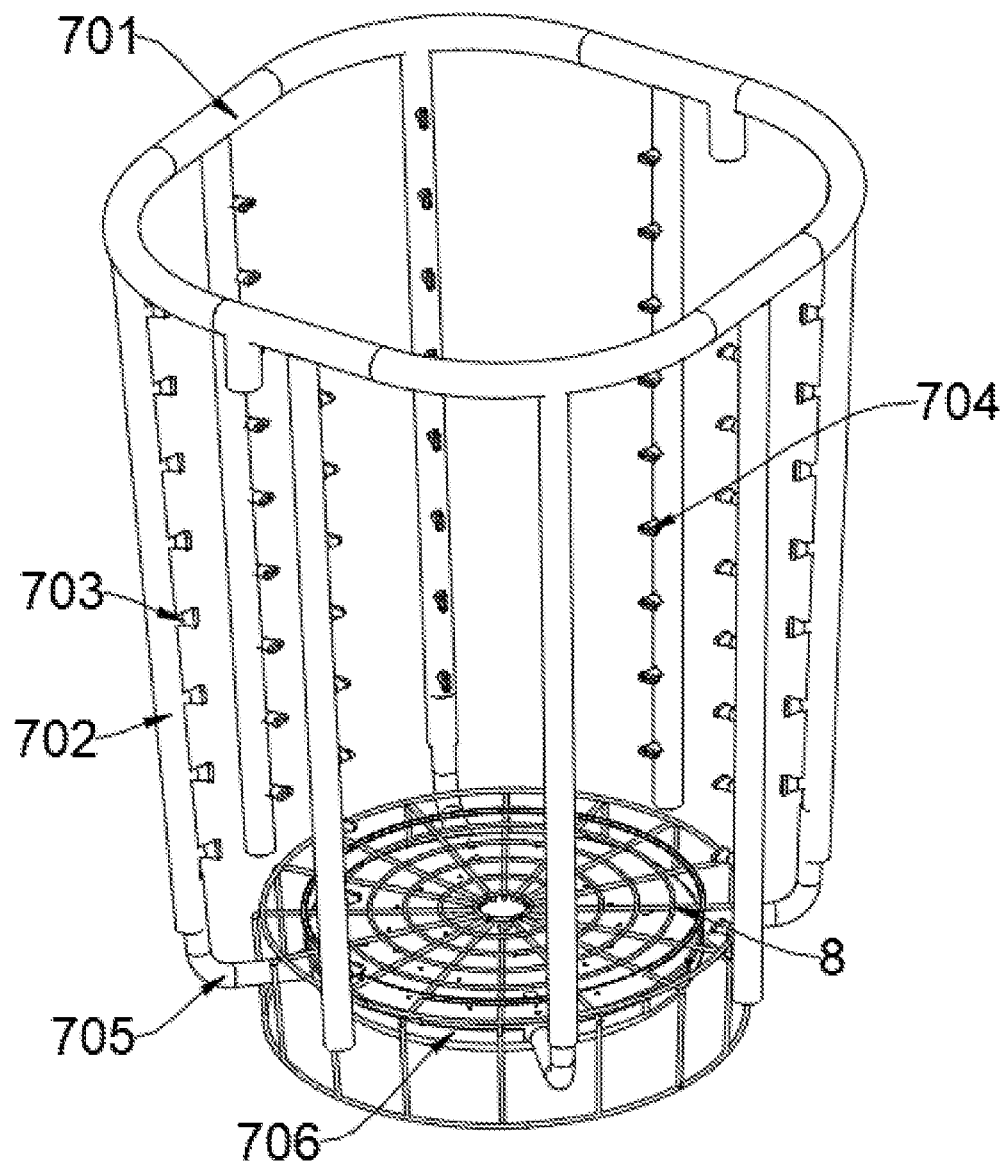
FIG. 5 is a structural schematic diagram of the air blow frame of the invention.
Figure 6:
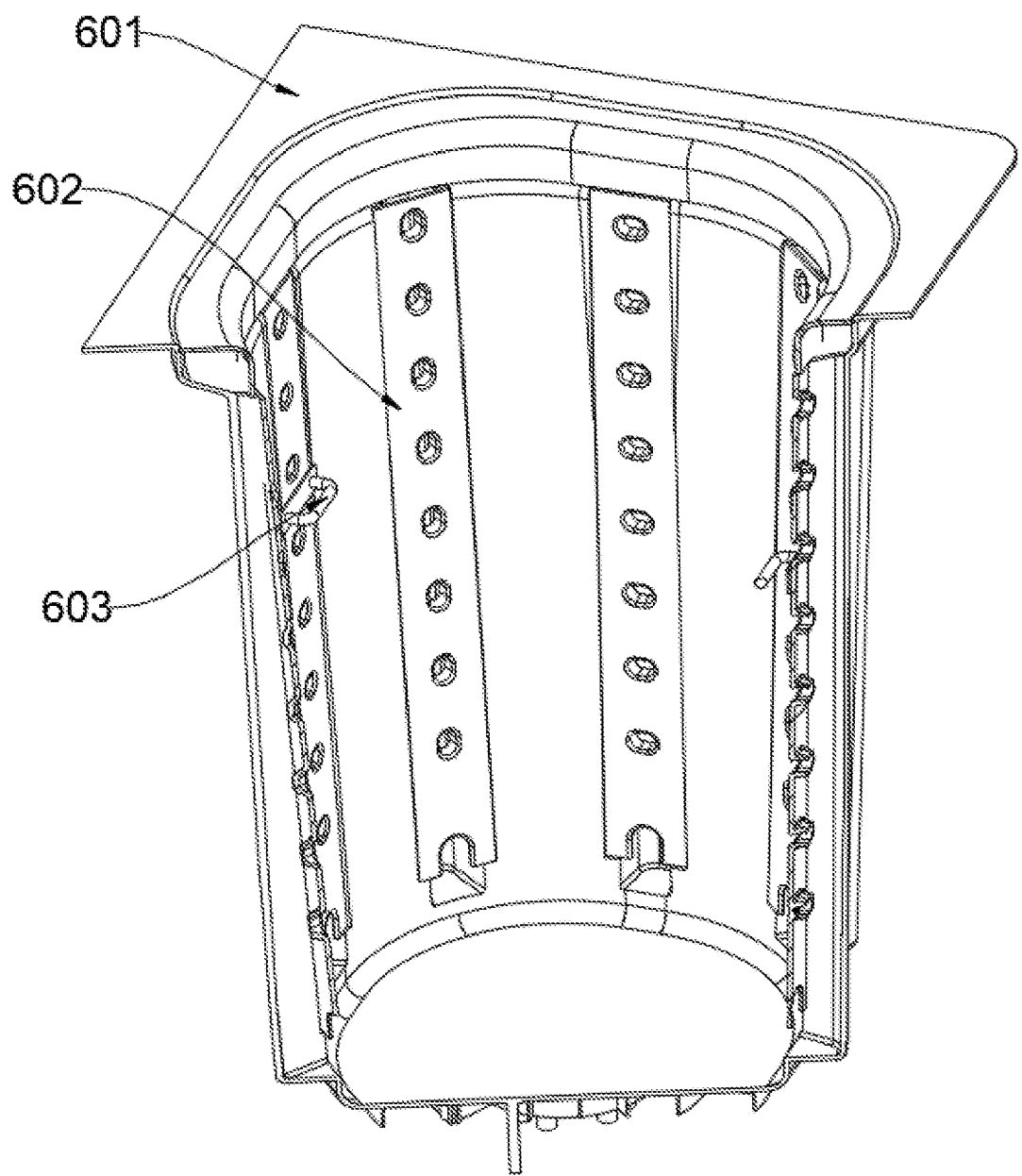
FIG. 6 is a cross-sectional structural schematic diagram of the cleaning drum of the invention.
Figure 7:
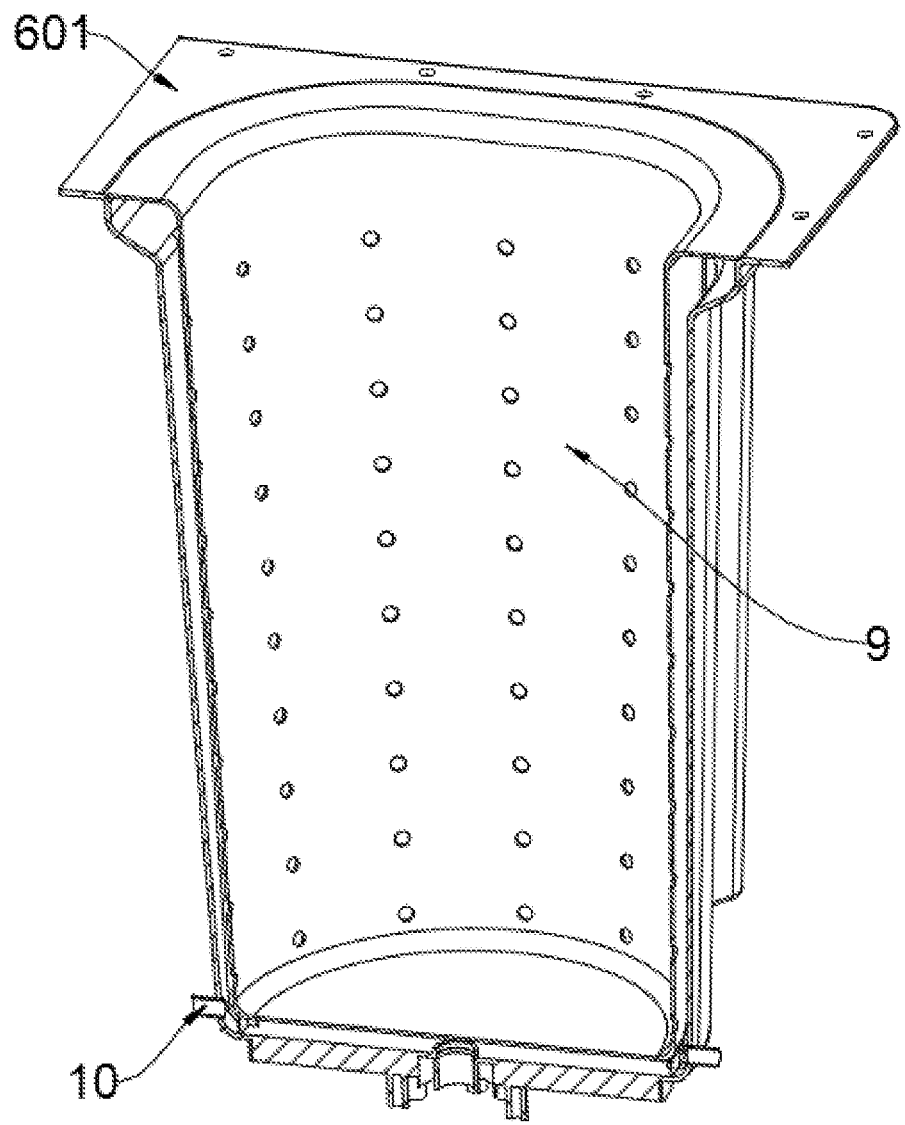
FIG. 7 is a schematic diagram of the installation structure of the air uniform barrel of the invention.

In the figures: 1 refers to the cleaning machine housing; 2 refers to the universal wheels; 3 refers to the transparent protective cover; 4 refers to the main frame; 5 refers to the supporting chassis; 6 refers to the cleaning drum; 601 refers to the drum body; 602 refers to the air blow pipe guard; 603 refers to the dog leash bolt seat; 601b refers to the drum body; 602b refers to the air blow pipe positioning groove; 603b refers to the dog leash bolt seat; 7 refers to the air blow frame; 701 refers to the upper air delivery annular pipe; 702 refers to the vertical air blow pipe; 703 refers to the nozzle; 704 refers to the flat spout; 705 refers to the connecting elbow; 706 refers to the air blow disk; 701b refers to the upper air delivery annular pipe; 702b refers to the vertical air blow pipe; 703b refers to the lower air delivery annular pipe; 704b refers to the air blow port; 8 refers to the placement bracket; 9 refers to the air uniform barrel; 10 refers to the air injection pipe; 11 refers to the overflow port; 12 refers to the impeller; 13 refers to the impeller motor; 14 refers to the blower.

5. SPECIFIC EMBODIMENT OF THE INVENTION

The technical solutions in the embodiments of the invention are further described clearly and completely with reference to the accompanying drawings in the embodiments of the invention. Obviously, the described embodiments are only part of, but not all, embodiments of the invention.

Embodiment 1: please refer to FIG. 1-FIG. 7, an embodiment provided by the invention: a sitting type automatic cleaning machine for pets, comprising a cleaning machine housing 1; the cleaning machine housing 1 further comprises frame profiles and metal guards; one inner side of the frame profiles is provided with a cleaning drum 6, the inside of the cleaning drum 6 is clamped with an air blow frame 7, and the upper edge of the air blow frame 7 near the bottom is snapped with a placement bracket 8; a blower 14 is fixedly installed on the other inner side of the frame profiles near the upper position, and the bottom end of the air blow frame 7 is provided with an air injection pipe 10, and the blower 14 and the air injection pipe 10 are connected by a hose. The top of the cleaning drum 6 is covered with a transparent protective cover 3. The metal guards are fixedly installed on the surface of the frame profiles, universal wheels 2 are installed on the four end corners of the bottom surface of the cleaning machine housing 1, and the air injection pipe 10 is provided with a check valve. In all, the cleaning efficiency is greatly improved by the quick cleaning and drying in all directions. Additionally, safety of the pet in the cleaning process is guaranteed, and the air blow frame can be replaced.

The inside of the cleaning drum 6 is plugged with an air uniform barrel 9, and the inner wall of the air uniform barrel 9 is arranged in a circular arrangement and evenly provided with a plurality of thin through holes. The cleaning drum 6 includes a drum body 601, air blow pipe guards 602 and dog leash bolt seats 603, the annular surface of the inner wall of the drum body 601 is evenly provided with eight air blow pipe guards 602, and the inner wall of the drum body 601 is symmetrically fixed with two dog leash bolt seats 603.

Adopting the above technical scheme, the air blow frame 7 can be protected and fixedly installed by the air blow pipe guards 602.

The air blow frame 7 comprises an upper air delivery annular pipe 701, vertical air blow pipes 702, nozzles 703, connecting elbows 705, and an air blow disk 706. The air blow disk 706 is provided below the upper air delivery annular pipe 701, eight vertical air blow pipes 702 are arranged between the air blow disk 706 and the upper air delivery annular pipe 701, and the bottom ends of the four vertical air blow pipes 702 spaced apart from each other are connected to the air blow disk 706 through connecting elbows 705. The air blow disk 706 is located between the lower part of the placement bracket 8 and the bottom surface of the drum body 601. One side of the two connecting elbows 705 is connected with the air injection pipes 10. The tops of the eight vertical air blow pipes 702 are all connected to the inner wall of the upper air delivery annular pipe 701, and a plurality of nozzles 703 are linearly arranged in each of the vertical air blow pipes 702 toward the axis of the drum body 601. The top of each nozzle 703 is fixed with a flat spout 704, the number of the thin through holes is the same as that of the flat nozzles 704, and the axes of the thin through holes and the flat nozzle 704 are collinear.

Adopting the above technical scheme, the air blow frame 7 facilitates the multi-point input and diversion of the dry hot air.

Figure 8:
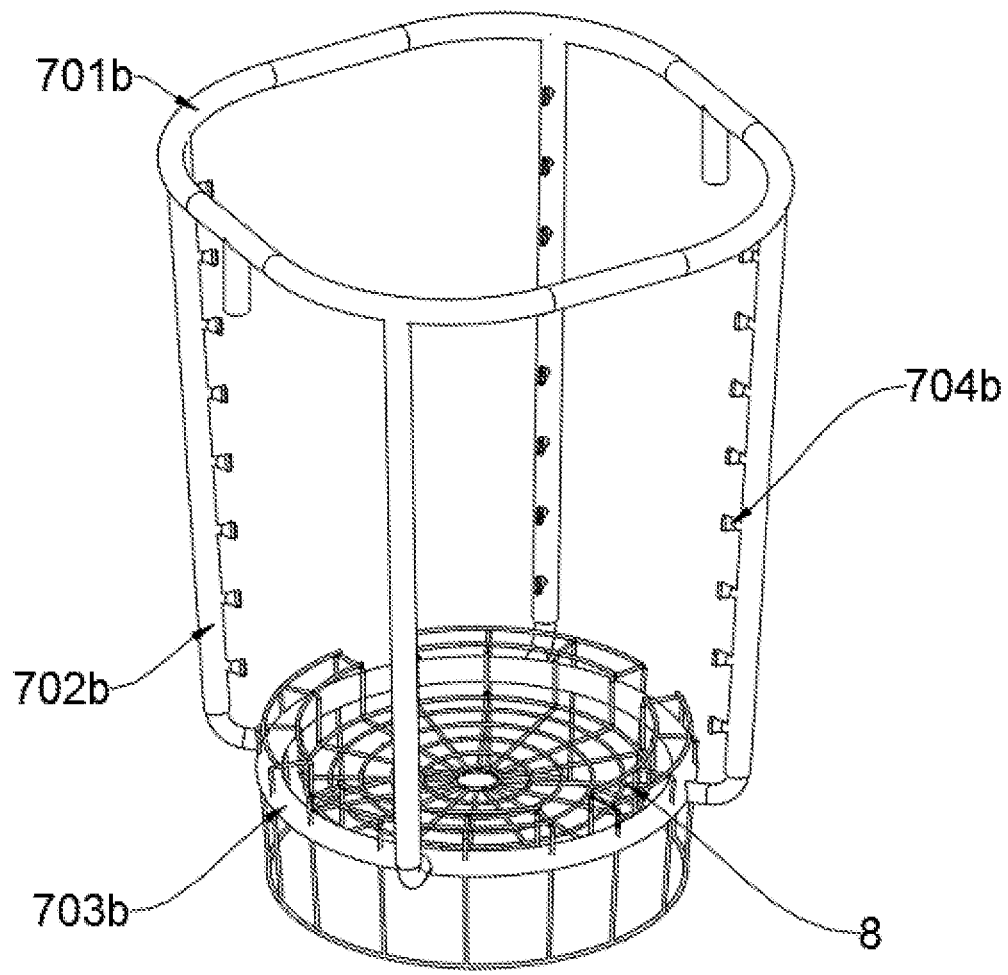
FIG. 8 is a schematic diagram of the installation structure of the upper air delivery annular pipe of the invention.
Figure 9:
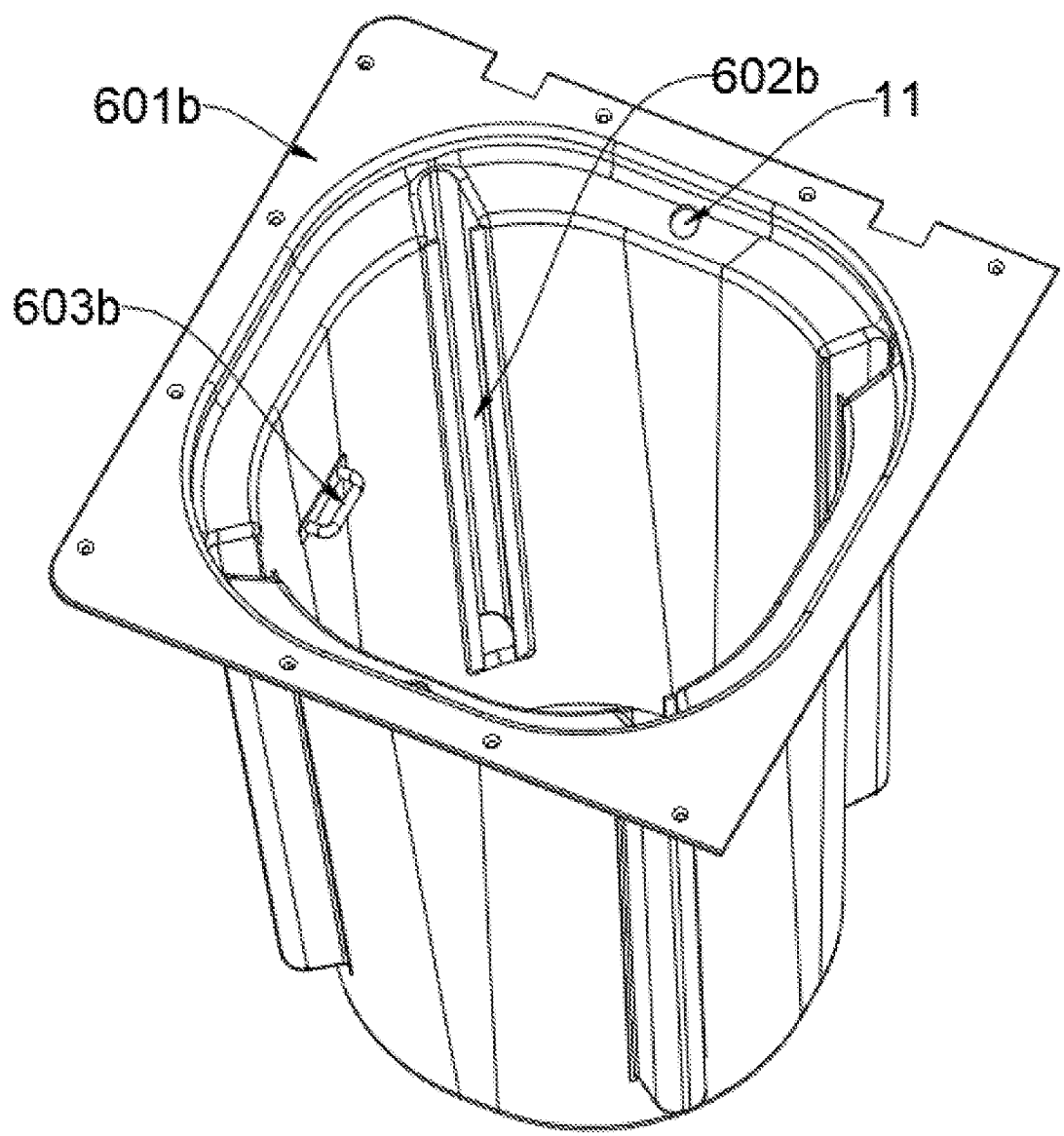
FIG. 9 is a structural schematic diagram of the air blow pipe positioning groove of the invention.
Figure 10:
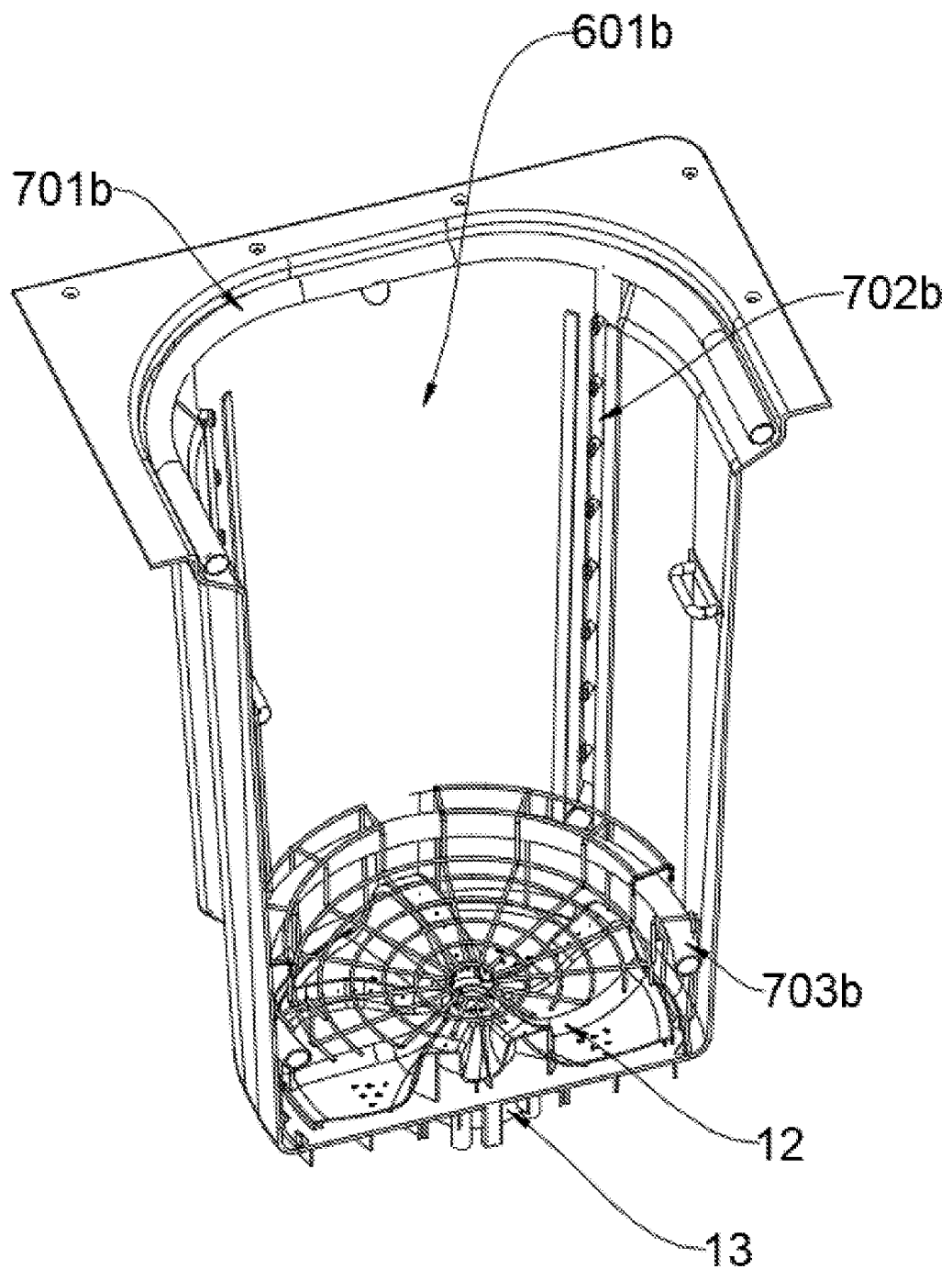
FIG. 10 is a schematic diagram of the installation structure of the vertical air blow pipe of the invention.

Embodiment 2: please refer to FIG. 8-FIG. 10, an embodiment provided by the invention: comprising a cleaning machine housing 1; the cleaning machine housing 1 further comprises frame profiles and metal guards; one inner side of the frame profiles is provided with a cleaning drum 6, the inside of the cleaning drum 6 is clamped with an air blow frame 7, and the upper edge of the air blow frame 7 near the bottom is snapped with a placement bracket 8; a blower 14 is fixedly installed on the other inner side of the frame profiles near the upper position, and the bottom end of the air blow frame 7 is provided with an air injection pipe 10, and the blower 14 and the air injection pipe 10 are connected by a hose. The metal guards are fixedly installed on the surface of the frame profiles, universal wheels 2 are installed on the four end corners of the bottom surface of the cleaning machine housing 1, and the air injection pipe 10 is provided with a check valve. The top of the cleaning drum 6 is covered with a transparent protective cover 3. In all, the cleaning efficiency is greatly improved by the quick cleaning and drying in all directions, meanwhile the safety of the pet in the cleaning process is guaranteed. Additionally, the air blow frame can be replaced, facilitating the switch between two ventilation modes.

The cleaning drum 6 further comprises a drum body 601b, air blow pipe positioning grooves 602b, and dog leash bolt seats 603b; the annular surface of the inner wall of the drum body 601b is uniformly provided with four air blow pipe positioning grooves 602b, and the inner wall near the top of the drum body 601b is symmetrically provided with two dog leash bolt seats 603b.

Adopting the above technical scheme, the dog leash bolt seats 603b help hang the dog leash, which in turn facilitates keeping the pet stable.

The air blow frame 7 further comprises an upper air delivery annular pipe 701b, vertical air blow pipes 702b; a lower air delivery annular pipe 703b, and air blow ports 704b. The lower air delivery annular pipe 703b is located under the placement bracket 8 below the upper air delivery annular pipe 701b, and the lower edge of the upper air delivery annular pipe 701b is connected with the outer edge of the lower air delivery annular pipe 703b through four vertical air blow pipes 702b. Air blow ports are arranged on the vertical air blow pipes 702b vertically and linearly in the direction of the drum body 601b axis, and the lower air delivery annular pipe 703b is connected to the air injection pipe 10. The vertical air blow pipes 702b snap into the air blow pipe positioning grooves 602b corresponding to the inner wall of the drum body 601b.

Adopting the above technical scheme, the air blow ports 704b facilitates the blowing and drying for pets from multiple angles.

An impeller 12 is provided above the bottom surface of the drum body 601b and below the placement bracket 8. The upper side edge of the drum body 601b is provided with an overflow port 11, the bottom of the drum body 601 is fixedly installed with an impeller motor 13, and the impeller motor 13 is connected to the impeller 12 through an output shaft and a coupling, and the connection is sealed.

Adopting the above technical scheme, the impeller motor 13 drives the impeller 12 to rotate, thereby driving and rotating the clean water.

When the invention is in operation, it is necessary to check whether the function of each part is intact. Place the pet to be cleaned inside the drum body 601, wherein the placement bracket 8 can support the pet, facilitating the pet to stand or lie down. The dog leash can be easily hung on the dog leash bolt seats 603, so as to maintain the stability of the pet. Place the transparent protective cover 3 on the upper surface of the cleaning machine housing 1. The transparent protective cover 3 can effectively avoid splashing of water droplets, and the cleaning process of the pet can be observed in real time. Turn on the power, and inject an appropriate amount of water into the drum body 601 according to the height and body-shape of the pet. Place the air blow frame 7 and the air uniform barrel 9 into the cleaning drum by the side respectively, and the pets are dried through the air spraying frame 7 after being cleaned. Both ends of the upper air delivery annular pipe 701 are provided with an air inlet pipe, which is convenient for injecting hot dry air into the upper air delivery annular pipe 701 through the air inlet pipe after the pet is cleaned. Eight vertical air blow pipes 702 facilitate the distribution of hot dry air, meanwhile the upper air delivery annular pipe 701 and the air blow disk 706 are connected to the connecting elbows 705 through four vertical air blow pipes 702. The air blow disk 706 and the nozzles 703 are convenient to blow and dry pets in all directions through the flat spouts 704. The air blow pipe guards 602 help protect the vertical air blow pipes 702. When using the air uniform barrel 9 to dry the pet after cleaning, the air uniform barrel 9 and the air blow frame 7 can be replaced. Ventilation holes are provided on the outer surface of the air uniform barrel 9, facilitating the air uniform barrel 9 to dry the pet with even ventilation through the air injection pipe 10.

It will be apparent to those skilled in the art that the invention is not limited to the details of the above exemplary embodiments, but that the invention can be implemented in other specific forms without departing from the spirit or essential characteristics of the invention. Accordingly, the embodiments should be considered in all respects to be exemplary and non-restrictive. The scope of the invention is defined by the appended claims, rather than the foregoing description, and all changes that come within the meaning and range of equivalency of the claims are therefore intended to be embraced within this invention. Any reference signs in the claims shall not be construed as limiting the involved claim.

What is claimed is:

1. A sitting type automatic cleaning machine for pets, comprises a cleaning machine housing; the cleaning machine housing further comprises frame profiles and metal guards; one inner side of the frame profiles is provided with a cleaning drum, a blower is fixedly installed on inner side of the frame profiles near an upper position, and a bottom end of an air blow frame is provided with an air injection pipe, and the blower and the air injection pipe are connected by a hose; a top of the cleaning drum is covered with a transparent protective cover;

wherein the metal guards are fixedly installed on a surface of the frame profiles, universal wheels are installed on end corners of a bottom surface of the cleaning machine housing, and the air injection pipe is provided with a check valve;

wherein an inside of the cleaning drum is plugged with an air uniform barrel, and an inner wall of the air uniform barrel is arranged in a circular arrangement and evenly provided with a plurality of thin through holes;

wherein the cleaning drum includes a drum body, air blow pipe guards and dog leash bolt seats, an annular surface of an inner wall of the drum body is evenly provided with eight air blow pipe guards, and the inner wall of the drum body is symmetrically fixed with two dog leash bolt seats;

wherein the air blow frame comprises an upper air delivery annular pipe, vertical air blow pipes, nozzles, connecting elbows, and an air blow disk; the air blow disk is provided below the upper air delivery annular pipe, vertical air blow pipes are arranged between the air blow disk and the upper air delivery annular pipe, bottom ends of vertical air blow pipes spaced apart from each other are connected to the air blow disk through the connecting elbows, one side of two connecting elbows is connected with the air injection pipes, a top of vertical air blow pipes are all connected to an inner wall of the upper air delivery annular pipe, the nozzles are linearly arranged in each of the vertical air blow pipes toward an axis of the drum body, a top of each nozzle is fixed with a flat spout, the thin through holes are same as that of flat nozzles, and an axes of the thin through holes and the flat nozzle are collinear.

2. The sitting type automatic cleaning machine for pets according to claim 1, wherein an air blow disk is located between a lower part of the placement bracket and an bottom surface of the drum body.

3. The sitting type automatic cleaning machine for pets according to claim 1, wherein the cleaning drum further comprises a drum body, air blow pipe positioning grooves, and dog leash bolt seats; an annular surface of an inner wall of the drum body is uniformly provided with air blow pipe positioning grooves, and the inner wall near a top of the drum body is symmetrically provided with two dog leash bolt seats.

4. The sitting type automatic cleaning machine for pets according to claim 3, wherein the air blow frame further comprises an upper air delivery annular pipe, vertical air blow pipes; a lower air delivery annular pipe, and air blow ports; the lower air delivery annular pipe is located under the placement bracket below the upper air delivery annular pipe, and a lower edge of the upper air delivery annular pipe is connected with an outer edge of the lower air delivery annular pipe through vertical air blow pipes; the air blow ports are arranged on the vertical air blow pipes vertically and linearly in a direction of a drum body axis, and the lower air delivery annular pipe is connected to the air injection pipe.

5. The sitting type automatic cleaning machine for pets according to claim 4, wherein an impeller is provided above a bottom surface of the drum body and below the placement bracket; an upper side edge of the drum body is provided with an overflow port, a bottom of the drum body is fixedly installed with an impeller motor.

\* \* \* \* \*